(12) United States Patent
Takenoshita et al.

(10) Patent No.: US 9,070,404 B2
(45) Date of Patent: Jun. 30, 2015

(54) RECORDING TAPE CARTRIDGE

(75) Inventors: Kenji Takenoshita, Kanagawa (JP); Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 191 days.

(21) Appl. No.: 13/481,866

(22) Filed: May 28, 2012

(65) Prior Publication Data

US 2012/0305693 A1 Dec. 6, 2012

(30) Foreign Application Priority Data

May 30, 2011 (JP) ................................. 2011-120683

(51) Int. Cl.
*B65H 75/08* (2006.01)
*G11B 23/04* (2006.01)

(52) U.S. Cl.
CPC ............ *G11B 23/043* (2013.01); *G11B 23/044* (2013.01)

(58) Field of Classification Search
CPC .... G11B 23/107; G11B 23/044; B65H 75/14; B65H 2701/378
USPC ........ 242/348–348.2, 338–338.1, 608, 608.8, 242/609, 609.4, 610.6, 613, 613.1
See application file for complete search history.

(56) References Cited

U.S. PATENT DOCUMENTS

| | | | | |
|---|---|---|---|---|
| 1,047,113 A * | 12/1912 | Olsen | .......................... | 242/396.8 |
| 1,391,372 A * | 9/1921 | Connell | ...................... | 242/610.3 |
| 2,392,492 A * | 1/1946 | Morgan et al. | ................. | 242/585 |
| 3,399,845 A * | 9/1968 | Krtous et al. | .............. | 242/584.1 |
| 4,002,310 A * | 1/1977 | Ganser et al. | ................. | 242/608 |
| 5,074,482 A * | 12/1991 | Imai | ............................... | 242/336 |
| D359,440 S * | 6/1995 | Stewart | ......................... | D8/359 |
| 5,547,146 A * | 8/1996 | Kita | ............................. | 242/548.4 |
| 5,803,388 A * | 9/1998 | Saliba et al. | ................... | 242/348 |
| 5,826,720 A * | 10/1998 | Morita | ........................ | 206/387.1 |
| 5,833,160 A * | 11/1998 | Enomoto et al. | .............. | 242/348 |
| 5,913,420 A * | 6/1999 | Morita | ........................ | 206/308.3 |
| 6,450,438 B1 * | 9/2002 | McAllister et al. | ........ | 242/548.3 |
| 6,618,224 B2 * | 9/2003 | Cripps et al. | ................... | 360/132 |

(Continued)

FOREIGN PATENT DOCUMENTS

| JP | 11-306714 A | 11/1999 |
|---|---|---|
| JP | 2001-093258 A | 4/2001 |

(Continued)

OTHER PUBLICATIONS

Office Action issued on Dec. 6, 2011, for corresponding Japanese Application.

*Primary Examiner* — Emmanuel M Marcelo
*Assistant Examiner* — Michael Gallion
(74) *Attorney, Agent, or Firm* — Solaris Intellectual Property Group, PLLC

(57) ABSTRACT

A recording tape cartridge capable of keeping position error signals during running of a recording tape small. A recording tape cartridge is provided with a reel hub, a magnetic tape that is wound round the reel hub, and a lower flange and upper flange that are disposed to oppose one another at each of the both axial direction ends of the reel hub. In a state in which the magnetic tape is completely wound on the reel hub, the magnetic tape is offset toward the upper flange. A space of an edge clearance between a lower end of an outermost periphery portion of the magnetic tape and the lower flange is at least 0.18 mm and at most 0.46 mm. A rate of widening of a facing distance between the lower flange and the upper flange increases toward the outer periphery side.

15 Claims, 11 Drawing Sheets

(56) References Cited

U.S. PATENT DOCUMENTS

| | | | |
|---|---|---|---|
| 6,719,238 B1* | 4/2004 | Grant et al. | 242/548.4 |
| 7,040,564 B1* | 5/2006 | Veno et al. | 242/338.1 |
| 7,243,877 B1* | 7/2007 | Anderson | 242/614 |
| 7,350,731 B2* | 4/2008 | Hiraguchi | 242/338.1 |
| 7,407,125 B2* | 8/2008 | Shiga | 242/332.4 |
| 7,533,848 B2* | 5/2009 | Miura et al. | 242/614 |
| 8,157,198 B2* | 4/2012 | Shiga | 242/332.4 |
| 8,360,352 B1* | 1/2013 | Moore | 242/388.1 |
| 2002/0005453 A1* | 1/2002 | Morita | 242/608.8 |
| 2003/0201356 A1* | 10/2003 | Alexander | 242/348 |
| 2005/0023400 A1* | 2/2005 | Hiraguchi | 242/348 |
| 2005/0051654 A1* | 3/2005 | Hiraguchi | 242/338.1 |
| 2005/0230513 A1* | 10/2005 | Asano | 242/338.1 |
| 2006/0169818 A1* | 8/2006 | Morita et al. | 242/338.1 |
| 2006/0255200 A1* | 11/2006 | Hoge | 242/338.1 |
| 2007/0252027 A1* | 11/2007 | Tsutsui | 242/613 |
| 2008/0135664 A1* | 6/2008 | Hiraguchi et al. | 242/348.1 |
| 2008/0179438 A1* | 7/2008 | Hiraguchi et al. | 242/332.4 |
| 2008/0191081 A1* | 8/2008 | Ishikawa et al. | 242/348 |
| 2008/0237382 A1* | 10/2008 | Shiga | 242/324.2 |
| 2008/0265077 A1* | 10/2008 | Shiga | 242/348.3 |
| 2010/0038465 A1* | 2/2010 | Takenoshita | 242/348 |
| 2011/0192929 A1* | 8/2011 | Hiraguchi | 242/348 |
| 2011/0240786 A1* | 10/2011 | Takenoshita | 242/348.3 |
| 2013/0277486 A1* | 10/2013 | Shakal | 242/398 |

FOREIGN PATENT DOCUMENTS

| | | | |
|---|---|---|---|
| JP | 2005-302256 A | | 10/2005 |
| JP | 2008-226387 A | | 9/2008 |
| JP | 2008226397 A | * | 9/2008 |
| JP | 2009-076178 A | | 4/2009 |
| JP | 2009-211743 A | | 9/2009 |
| JP | 2009-217869 A | | 9/2009 |
| JP | 4679733 B | | 4/2011 |

* cited by examiner

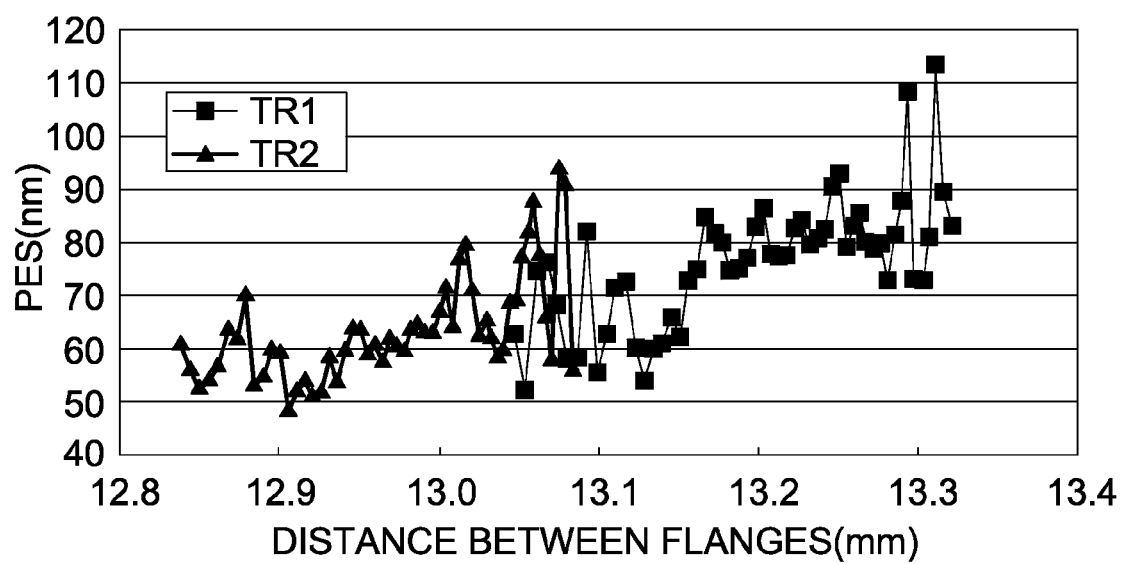

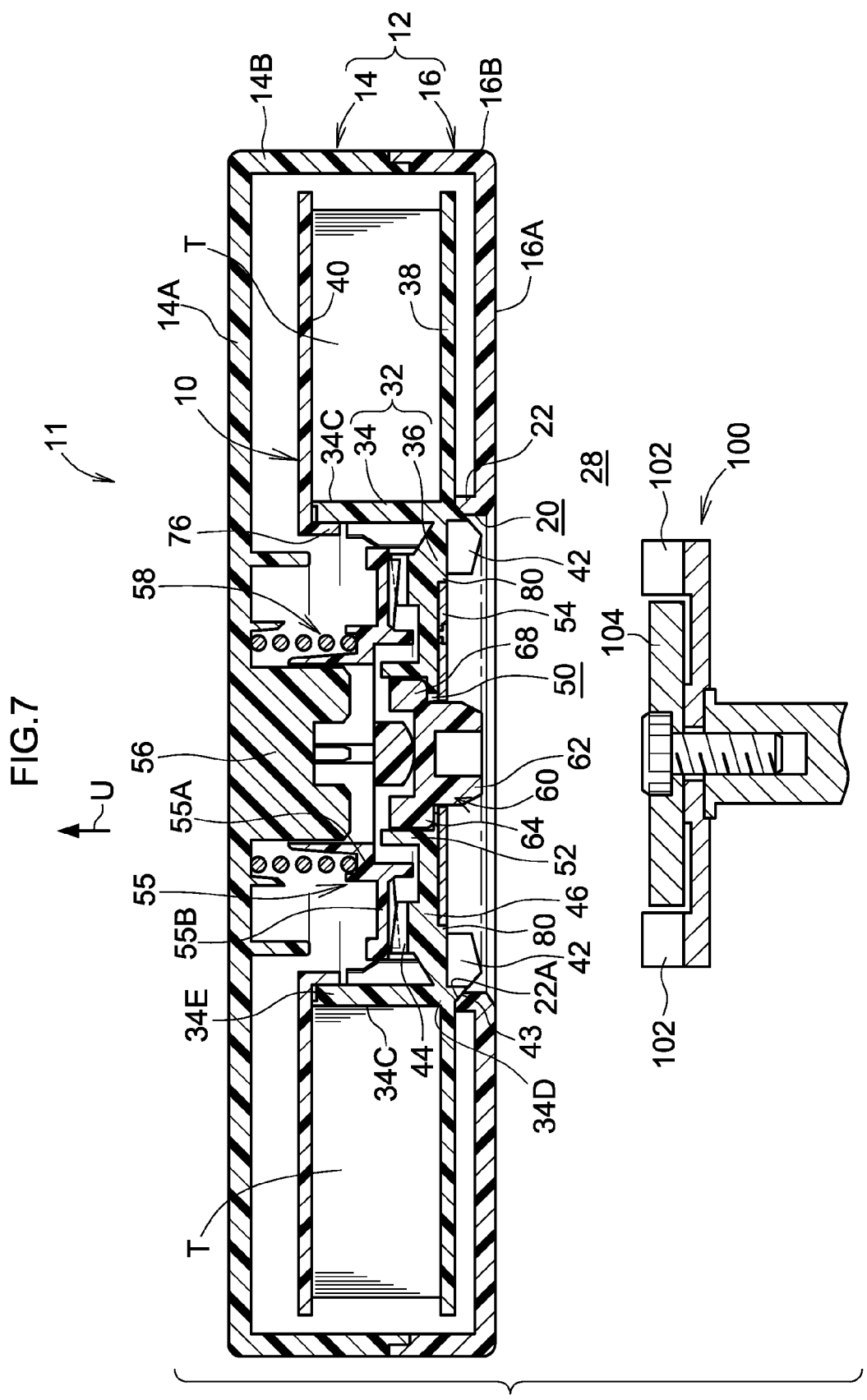

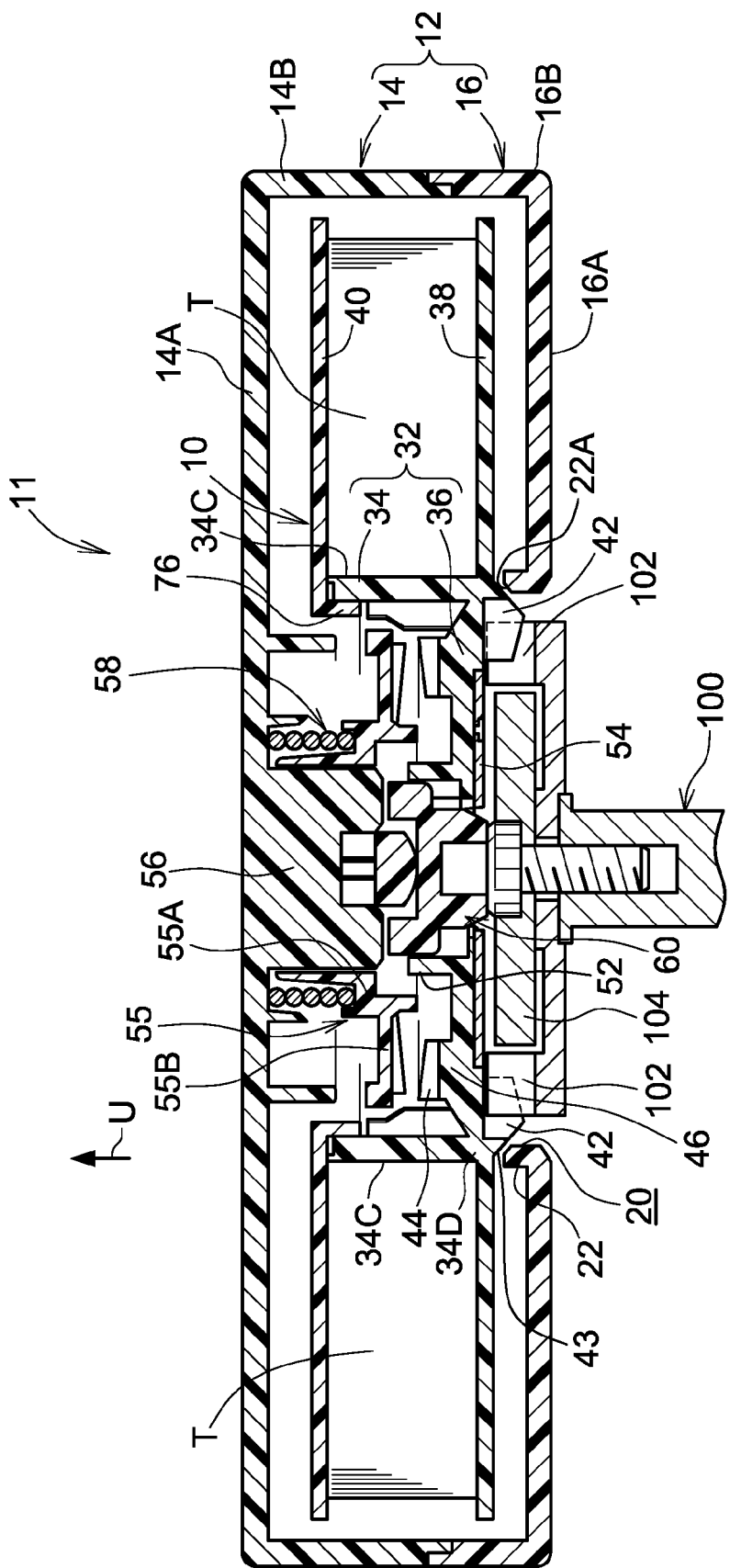

RECORDING TAPE CARTRIDGE

CROSS-REFERENCE TO RELATED APPLICATION

This application claims priority under 35 USC 119 from Japanese Patent Application No. 2011-120683 filed May 30, 2011, the disclosure of which is incorporated by reference herein.

BACKGROUND

1. Field of the Invention

The present invention relates to a recording tape cartridge in which a recording tape is used as a recording medium.

2. Related Art

A magnetic tape cartridge is known (for example, see Japanese Patent Application Laid-Open (JP-A) No. 11-306714) in which a facing distance H between a pair of upper and lower reel flanges is set to a value for which an excess gap E is added to a tape width of a magnetic tape. The excess gap E is not more than a width dimension of a buffer region of the magnetic tape. Further, a magnetic tape cartridge is known (for example, see JP-A No. 2005-302256) in which a difference between the facing distance, between a reference flange and an opposing flange, and the width dimension of a magnetic tape is prescribed. Further yet, a tape cartridge is known (for example, see JP-A No. 2009-211743) in which a surface of the flanges is a grained surface with a surface roughness Ra of between 0.5 μm and 2.0 μm. Further still, a technology is known (for example, see Japanese Patent No. 4,679,733) in which a distance between brim portions of a reel is prescribed and a running magnetic tape is reliably aligned with a guide roller at a drive. Thus, position error signals (PES) are made smaller.

Position error signals are a measure of mispositioning in a width direction of a recording tape with respect to a head of a drive device during running of the recording tape. In regard to keeping position error signals small, there is still room for improvement in the dimensions and shapes of a pair of flanges.

SUMMARY

The present invention is to provide a recording tape cartridge capable of keeping position error signals (PES) during running of a recording tape small.

A recording tape cartridge according to a first aspect includes: a hub; a recording tape that is wound around the hub; and a pair of flanges, the respective flanges being provided to face one another at either end in an axial direction of the hub, a distance in the axial direction between an outermost peripheral portion of the recording tape and the flange in a state in which the recording tape is completely wound around the hub being from 0.18 mm to 0.46 mm, a facing distance between the flanges being wider at an outer peripheral side than at an inner peripheral side of the flanges, and a rate of widening of the facing distance between the flanges increasing toward the outer peripheral side.

In the recording tape cartridge of the first aspect, in the state in which the whole of the recording tape is wound round the hub, the distance of a gap (hereinafter referred to as the edge clearance) formed between (a lower end of/an upper end of) the outermost periphery portion of the recording tape and the pair of flanges (a lower flange/an upper flange) is in a range which is from 0.18 mm to 0.46 mm (more than or equal to 0.18 mm, less than or equal to 0.46 mm). If the edge clearances are formed at both hub axial direction sides, the sum of the distances of the edge clearances is in a range which is from 0.18 mm to 0.46 mm (more than or equal to 0.18 mm and less than or equal to 0.46 mm).

The present inventors have attained new knowledge that the smaller the width of an edge clearance, the more position error signals (PES), which are a measure of mispositioning in the width direction with respect to a head of a drive device during running of a recording tape, are suppressed. In the present recording tape cartridge, the rate of widening of the facing distance of the pair of flanges increases further toward the outer periphery side. Therefore, compared to a configuration in which the rate of widening of a facing distance between a pair of flanges is constant, the edge clearance is smaller at the inner periphery side. That is, a range in which the edge clearance is small is expanded toward the outer periphery side. Therefore, in the present recording tape cartridge, in a configuration in which the edge clearance distance at the outermost periphery side is prescribed to be within a predetermined range, position error signals (PES) can be kept small at the inner periphery side, and an average value of position error signals (PES) decreases.

Thus, in the recording tape cartridge according to the first aspect, position error signals (PES) during running of the recording tape can be kept small.

A recording tape cartridge according to a second aspect of the invention is the recording tape cartridge according to the first aspect, further including a driven gear that is configured at the hub or at one of the pair of flanges such that a position of the hub in the axial direction with respect to a drive device is set, at mesh-faces that are inclined with respect to the axial direction, by the driven gear being meshed with a driving gear at the drive device so as to be capable of transmitting rotation.

In the recording tape cartridge of the second aspect, the hub is rotated by rotating of the driving gear at the drive device side that is meshed with the driven gear, and the magnetic tape is unwound from the hub or wound onto the hub. An axial direction position reference of the hub with respect to the drive device is the meshing faces of the driven gear and the driving gear. Position error signals (PES) tend to become large with such a structure. However, the position error signals (PES) are kept small by the flanges with the shape described above.

A recording tape cartridge according to a third aspect of the invention is the recording tape cartridge according to the first aspect or the second aspect, in which a surface roughness of a face at a recording tape side of at least one of the pair of flanges is from 0.5 μm to 2 μm (more than or equal to 0.5 μm, less than or equal to 2 μm) as a center line average roughness.

In the recording tape cartridge of the third aspect, because the surface roughness of the flange(s) is set as described above, variations in position in the width direction of the recording tape (the hub axis direction) due to contact between the flange(s) and the recording tape are less likely to occur, which contributes to the position error signals (PES) being kept small.

A recording tape cartridge according to a fourth aspect of the invention is the recording tape cartridge according to any one of the first to third aspects, in which the hub and the flanges comprise fiber-reinforced resin.

In the recording tape cartridge of the fourth aspect, because the hub and the flanges are constituted of high-resilience fiber-reinforced resin, deformations of the flanges (surface runouts) and the hub due to tape winding pressure are suppressed, which contributes to the position error signals (PES) being kept small.

A recording tape cartridge according to a fifth aspect of the invention is the recording tape cartridge according to any one of the first to third aspects, in which the hub is formed in the shape of a circular tube with a bottom, of which one end side in the axial direction is opened and the other end side is closed; and of the pair of flanges, a flange that is disposed at the one end side of the hub comprises a material with an elastic modulus equal to or greater than an elastic modulus of a material forming the hub, and a flange that is disposed at the other end side of the hub is integrated with another end portion of the hub.

In the recording tape cartridge of the fifth aspect, the flange is integrated with the bottom side of the hub, and the high-elasticity flange is fixed with the opening end portion that is at the low-stiffness side of the hub. Therefore, particularly deformations of the opening end side of the hub and the flange at the opening end side (surface runouts) due to tape winding pressure are suppressed, which contributes to the position error signals (PES) being kept even smaller.

A recording tape cartridge according to the present invention as described above has an excellent effect in that position error signals (PES) during running of a recording tape can be kept small.

BRIEF DESCRIPTION OF THE DRAWINGS

Embodiments of the invention will be described in detail with reference to the following figures, wherein:

FIG. 6 is a graph illustrating a relationship between a facing distance of a pair of flanges and position error signals.

FIG. 7 is a side sectional diagram of the recording tape cartridge in accordance with the exemplary embodiment of the present invention when not in use.

FIG. 8 is a side sectional diagram of the recording tape cartridge in accordance with the exemplary embodiment of the present invention when being used.

DETAILED DESCRIPTION

Figure 9A:
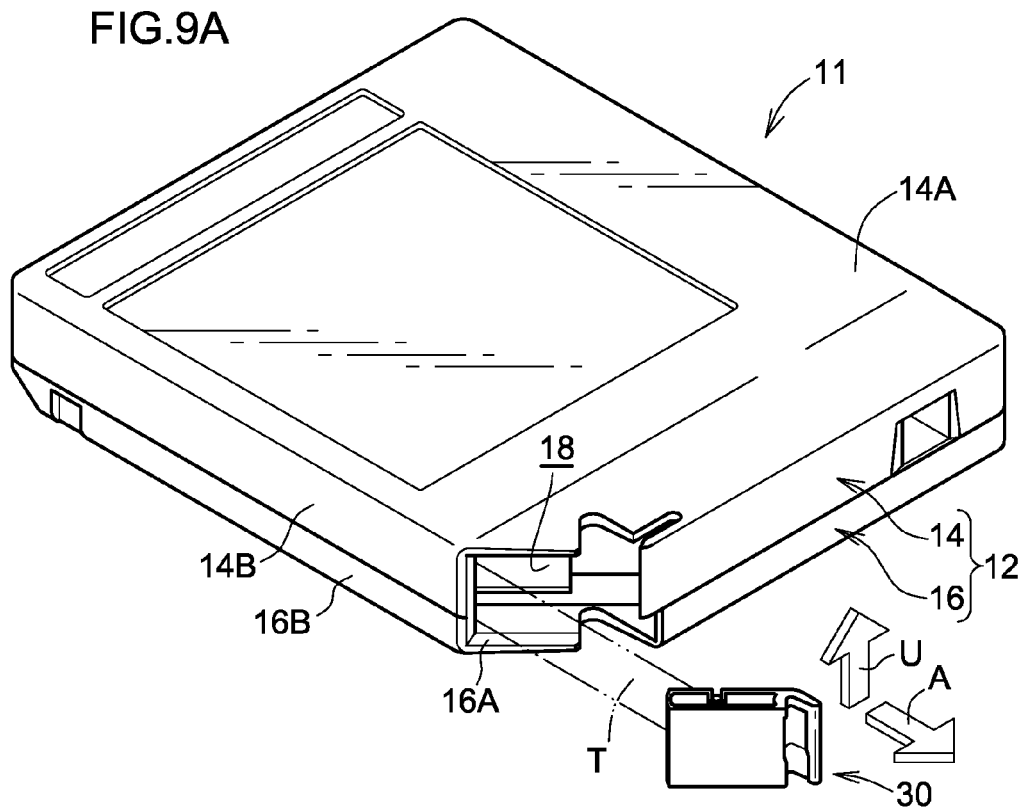
FIG. 9A is a perspective view, seen from above, showing the recording tape cartridge according to the exemplary embodiment of the present invention.
Figure 9B:
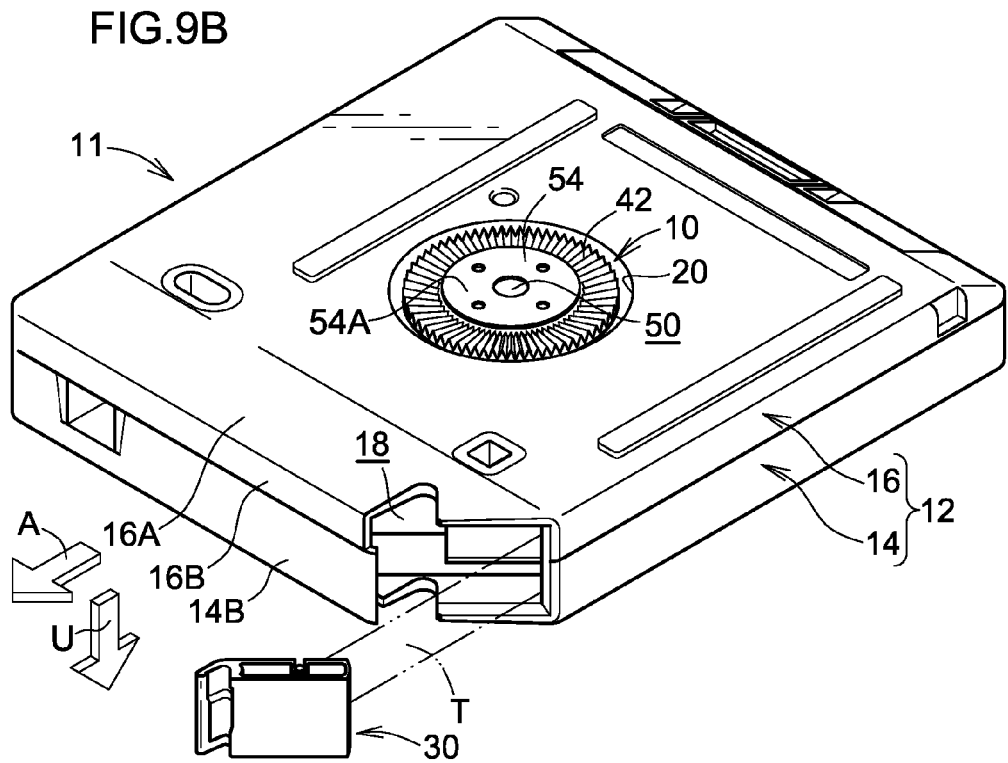
FIG. 9B is a perspective view, seen from below, showing the recording tape cartridge according to the exemplary embodiment of the present invention.
Figure 10:
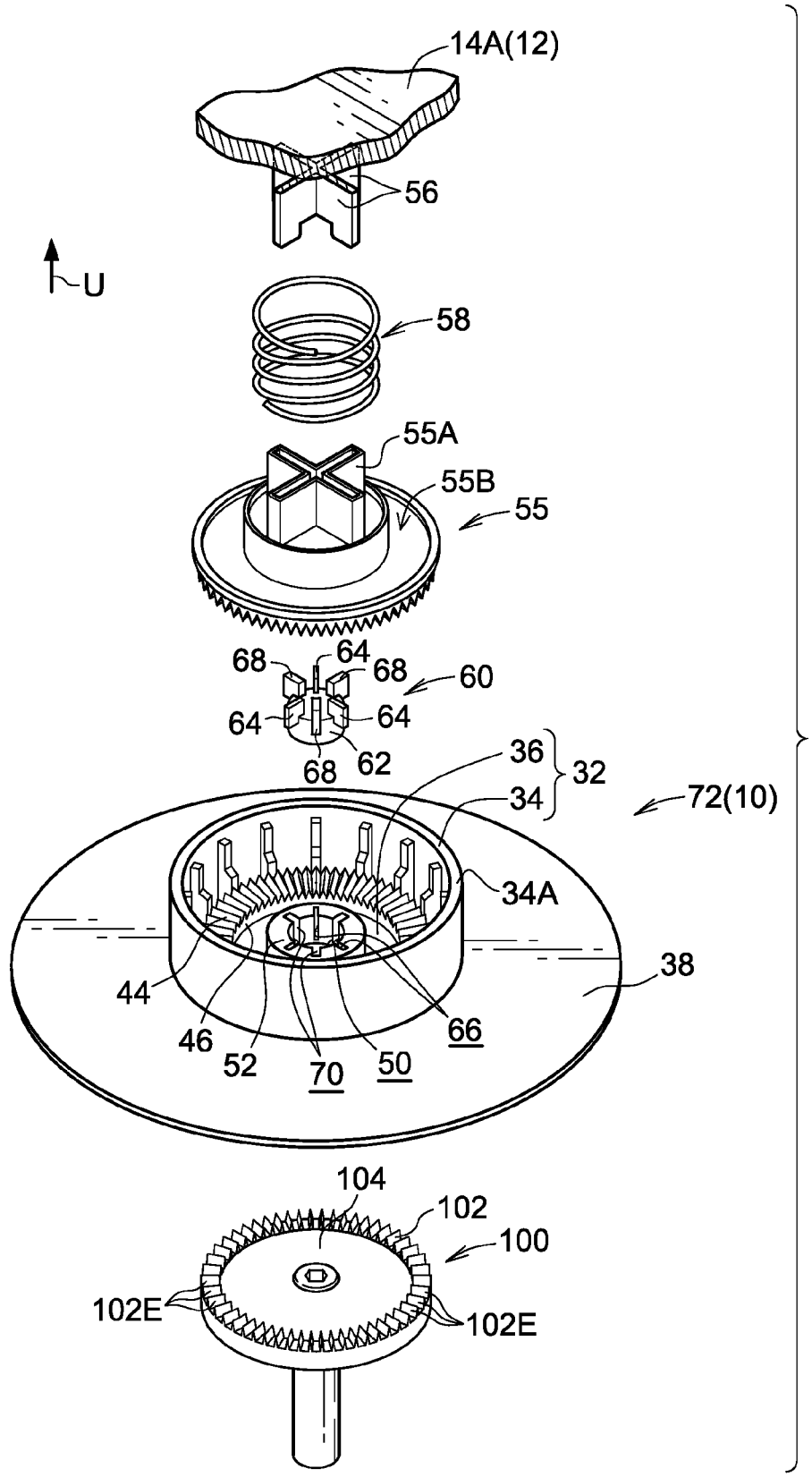
FIG. 10 is an exploded perspective view of reel lock structural portions of the recording tape cartridge according to the exemplary embodiment of the present invention.
Figure 11:
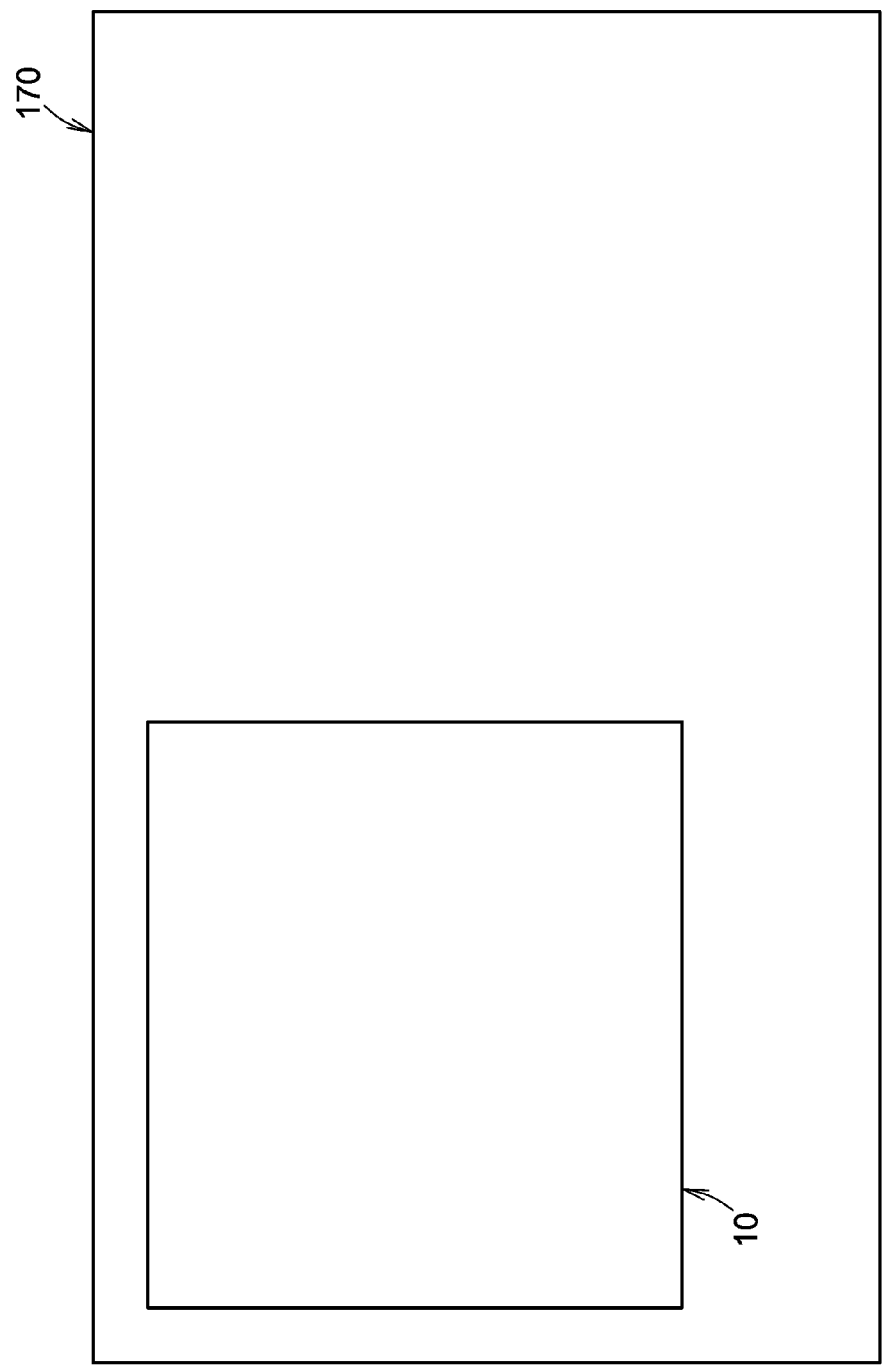
FIG. 11 is a simple plan view of a drive device and the recording tape cartridge.

A recording tape cartridge 10 according to an exemplary embodiment of the present invention is described on the basis of FIG. 1 to FIG. 11. First, general overall structure of the recording tape cartridge 10 is described. Then, the structure of principal portions of a reel 11 round which a magnetic tape T that serves as a recording tape is wound is described. For convenience of description, a direction of loading of the recording tape cartridge 10 into a drive device 170 in FIG. 11 is indicated by arrow A, and serves as a forward direction (front side) of the recording tape cartridge 10, and the direction indicated by arrow U is an upward direction (upper side) of the recording tape cartridge 10. It is noted that within this DETAILED DESCRIPTION section of the SPECIFICATION, the term "drive device" is intended to refer to "drive device 170".

—General Overall Structure of the Recording Tape Cartridge—

As shown in FIG. 7 to FIG. 10, the recording tape cartridge 10 according to this exemplary embodiment is provided with a case 12. The case 12 is constituted by an upper case 14 and a lower case 16 being joined together. Specifically, the upper case 14 is constituted with a peripheral wall 14B in a substantial frame shape standing along an outer edge of a ceiling (top) plate 14A with a substantially rectangular shape in plan view, and the lower case 16 is constituted with a peripheral wall 16B standing along an outer edge of a floor (bottom) plate 16A with a shape substantially corresponding with that of the ceiling plate 14A. The opening end of the peripheral wall 14B and the opening end of the peripheral wall 16B are matched up and, in this state, the case 12 is formed into a substantial box shape by the upper case 14 and the lower case 16 being joined together by ultrasonic welding, screw-fixing or the like.

The ceiling plate 14A, the peripheral wall 14B, the floor plate 16A and the peripheral wall 16B are each cut away at a corner portion of the case 12 at the leading side in the direction of loading into the drive device, and an opening 18 that is angled with respect the loading direction is formed. A circular gear aperture 20 penetrating through the floor plate 16A is formed at a substantially central portion of the floor plate 16A, for exposing a reel gear 42 which is described below. An annular rib 22 is provided at the floor plate 16A protruding to the interior of the case 12 from an edge portion of the gear aperture 20. The annular rib 22 is for positioning of the reel 11, which is described below, and for dustproofing.

As shown in FIG. 7, the single reel 11 is rotatably accommodated in the case 12. A magnetic tape T that serves as a recording tape is wound onto the reel 11, and a leader block 30 that serves as a leader member is attached to a distal end of the magnetic tape T. The leader block 30 is accommodated and retained at the inner side of the opening 18 of the case 12 when the recording tape cartridge 10 is not in use. In this state, the leader block 30 closes off the opening 18 and blocks ingressions of dust and the like into the case 12.

When the magnetic tape T is to be drawn out inside a drive device, the leader block 30 is taken out from the case 12 by a drawing member of the drive device, and is guided to a take-up reel (not shown in the drawings) of the drive device. A leader pin in a small rod shape or a leader tape in a tape shape may be employed as the leader member instead of the leader block. In such cases, for example, a door member is provided at the case 12 for opening and closing the opening 18. Further, the opening 18 may be formed along the peripheral wall 14B or 16B (only the peripheral wall 14B or 16B being cut away).

Figure 1:
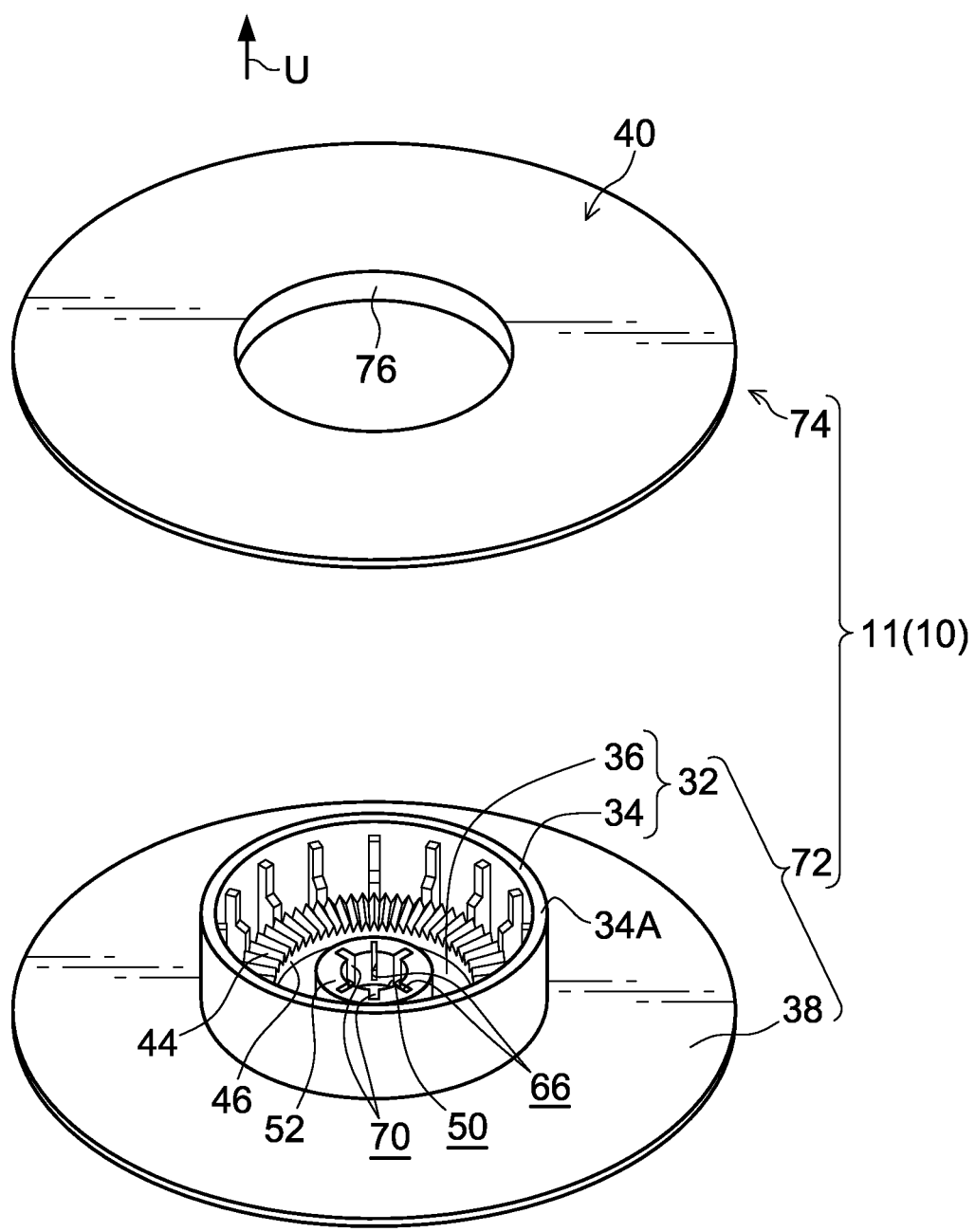
FIG. 1 is an exploded perspective diagram of a reel constituting a recording tape cartridge in accordance with an exemplary embodiment of the present invention.
Figure 2:
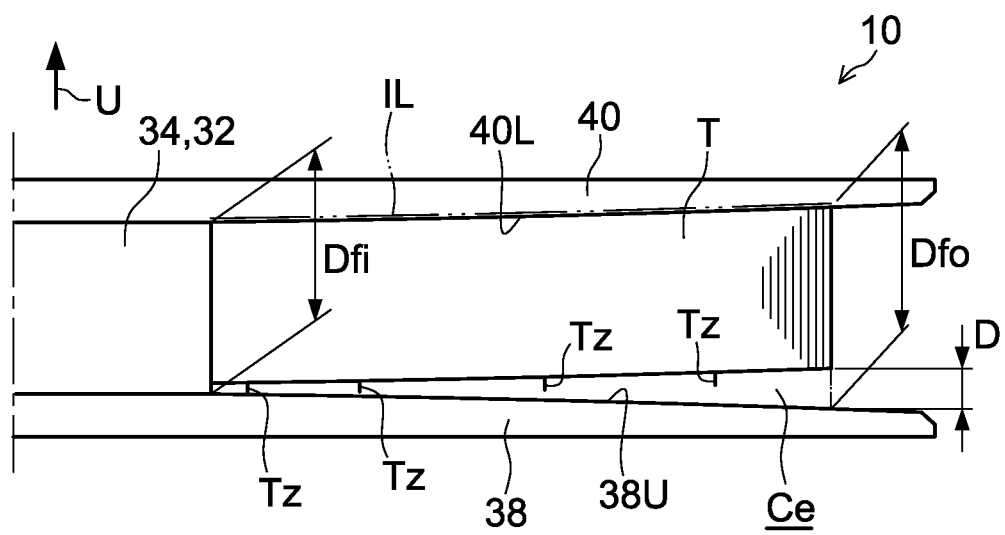
FIG. 2 is a side view of the reel constituting the recording tape cartridge in accordance with the exemplary embodiment of the present invention.
Figure 3:
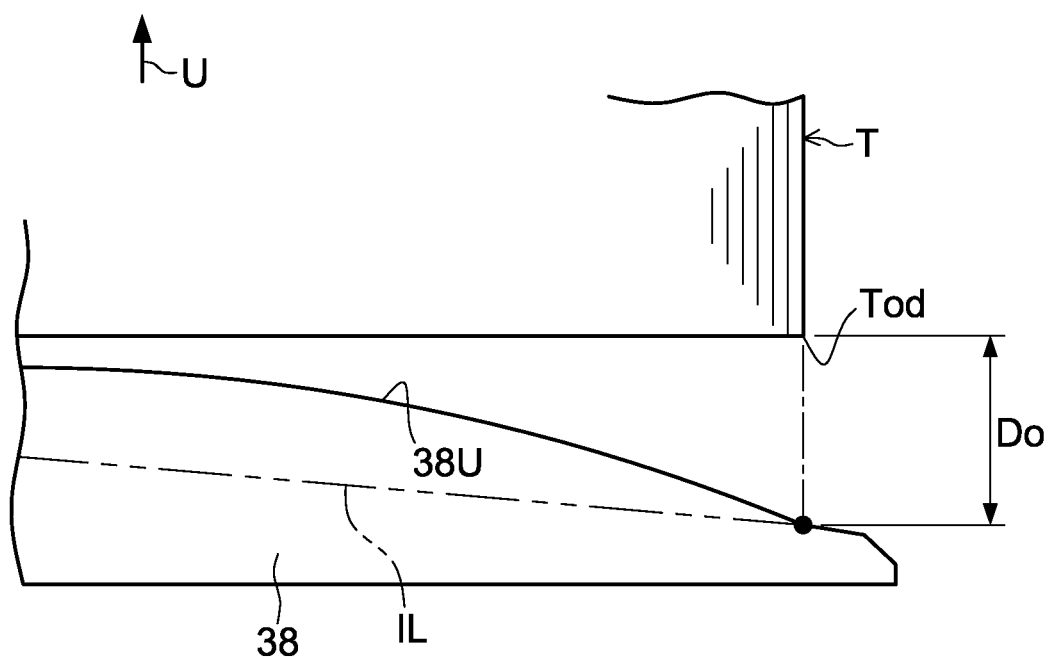
FIG. 3 is a side view in which a principal portion of the reel constituting the recording tape cartridge in accordance with the exemplary embodiment of the present invention is shown magnified.

As shown in FIG. 1 to FIG. 3, the reel 11 is provided with a reel hub 32 that serves as a hub constituting an axial central portion of the reel 11. The reel hub 32 is formed in the shape of a circular tube with a bottom, including a tube portion 34 and a floor portion 36 that closes off a lower portion of the tube portion 34. The magnetic tape T is wound on an outer periphery face of the tube portion 34. A lower flange 38 that projects to the radial direction outer side of the reel hub 32 is provided at a vicinity of the floor portion 36 side end portion (lower end portion) of the reel hub 32. An upper flange 40 that projects to the radial direction outer side of the reel hub 32 is provided at the upper end portion of the tube portion 34. The reel 11 is constituted such that the magnetic tape T can be wound round the outer periphery face of the tube portion 34 of the reel hub 32 between opposing faces of the lower flange 38 and the upper flange 40. Dimensions and shapes of the lower flange 38 and the upper flange 40 are described in more detail below.

Figure 4:
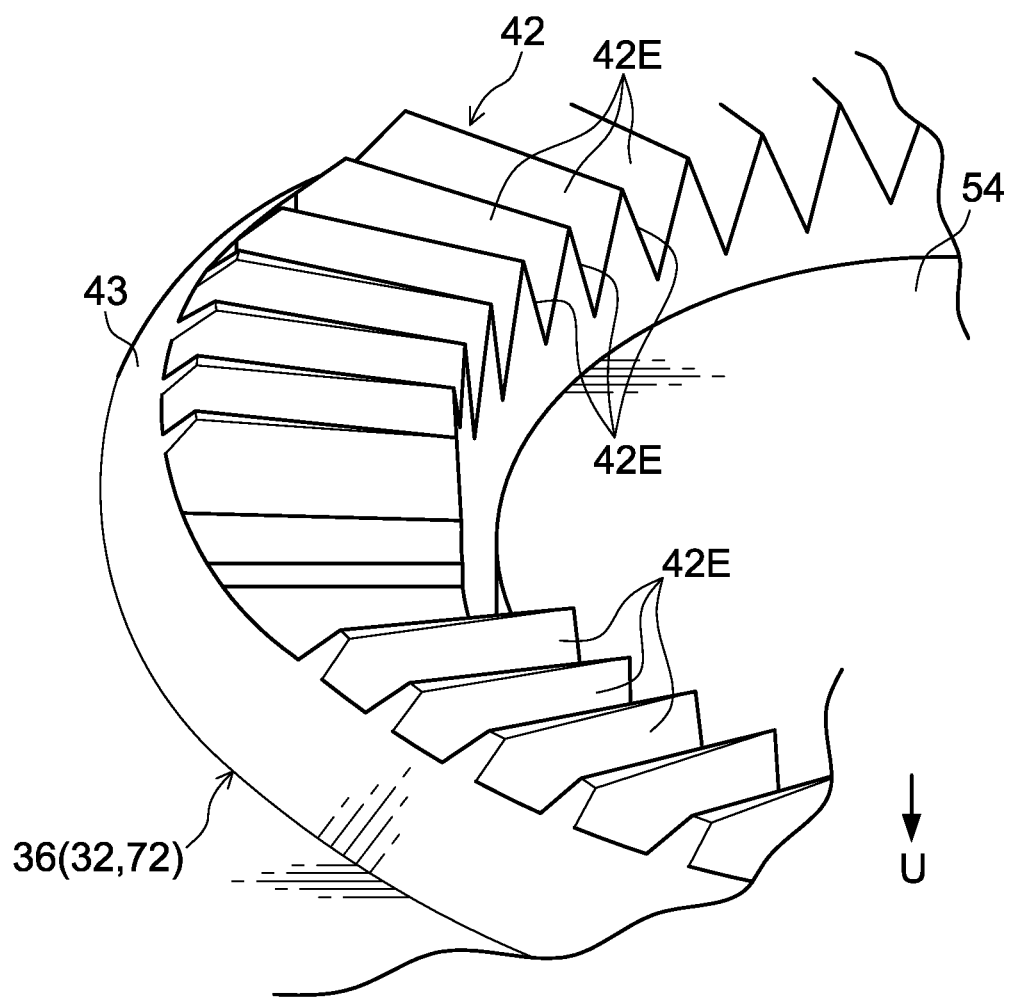
FIG. 4 is a perspective view in which a reel gear of the reel constituting the recording tape cartridge in accordance with the exemplary embodiment of the present invention is shown magnified.

The reel gear 42 is provided at an outer periphery vicinity of a lower face (outer face) of the floor portion 36 of the reel hub 32. The reel gear 42 is in an annular shape, is formed coaxially with the reel 11, and serves as a driven gear. The reel gear 42 is meshable with a driving gear 102 that is provided at a distal end of a rotary shaft 100 of a drive device. When the reel gear 42 and the driving gear 102 are meshed, the reel 11 is positioned in the axial direction with respect to the drive device. Specifically, as shown in FIG. 4, meshing faces 42E of the reel gear 42 that mesh with the driving gear 102 are inclined faces that are inclined with respect to the axial direction, and form a meshing structure with meshing faces 102E of the driving gear 102 (see FIG. 10) such that the transmission of rotation is possible and the position in the axial direction is set. An axial direction force for maintaining this meshing acts on the meshing portions in the form of an urging force from a compression coil spring 58 which is described below.

As shown in FIG. 1 and FIG. 10, an annular engaging gear 44 that is formed coaxially with the reel 11 is provided at an outer periphery vicinity of the upper face (inner face) of the floor portion 36 of the reel hub 32. The engaging gear 44 is formed on an annular pedestal portion 46 that protrudes a little from the inner face of the floor portion 36. The engaging gear 44 is formed to be meshable with a braking gear portion 55B of a brake member 55 which is described below.

A penetrating hole 50 is formed at an axial central portion of the floor portion 36 of the reel hub 32. A clutch boss portion 52 is provided standing from the upper face of the floor portion 36 along an edge portion of the penetrating hole 50. The clutch boss portion 52 is described below, together with a clutch member 60.

Principal portions of the reel 11 are formed by injection molding of a fiber-reinforced resin, as described below. The reel includes an annular reel plate 54 in the form of a metal plate that is fixed at the inner side of the reel gear 42 at the lower face (surface) of the floor portion 36 of the reel hub 32. The reel plate 54 is formed in an annular shape of a magnetic material and is fixed to be coaxial with the floor portion 36 of the reel hub 32. The annular reel plate 54 is for being attracted and retained by a magnet 104 of the rotary shaft 100 of the drive device.

The reel 11 described above is accommodated in the case 12 and rests on (is placed on) the annular rib 22 of the case 12 when the case 12 is not in use. Specifically, an outer side region (a vicinity of an inner edge of the lower flange 38) of a taper portion 43 of the floor portion 36 that is continuous from the radial direction outer side of the reel gear 42 abuts against an upper end face of the annular rib 22, and an inner edge portion of the upper end of the annular rib 22 is formed as a taper face 22A that matches up with the taper portion 43. Thus, displacement in the radial direction is restricted.

In this state, the reel 11 is entirely (bodily) disposed inside the case 12 and the reel gear 42 and reel plate 54 are exposed through the gear aperture 20 (see FIG. 9B). That is, the reel gear 42 does not protrude beyond the outer face (lower face) of the floor plate 16A but faces outside the case 12 through the gear aperture 20. A through-hole 54A is formed at the axial center of the reel plate 54, and the penetrating hole 50 faces the gear aperture 20 through the through-hole 54A. Thus, operations of the reel 11, that is, chucking (retention) and rotary driving of the reel 11, may be performed from outside the case 12.

As shown in FIG. 7, FIG. 8 and FIG. 10, the recording tape cartridge 10 is provided with the brake member 55, for blocking rotation of the reel 11 when not in use. Principal portions structuring the brake member 55 are a rotation restriction portion 55A and the braking gear portion 55B. A cross-rib 56 that is provided in protrude-manner from the ceiling plate 14A of the case 12 is inserted into the rotation restriction portion 55A and relative rotation of the brake member 55 with respect to the case 12 is restricted. The braking gear portion 55B extends to the radial direction outer side from the lower end of the rotation restriction portion 55A and is engageable with the engaging gear 44 of the reel 11.

The brake member 55 is constituted to be capable of selectively assuming a braked position and a rotation-allowed position by displacing in the axial direction of the reel 11 inside the case 12 when not in use. At the braked position, the braking gear portion 55B is meshed with the engaging gear 44. At the rotation-allowed position, the meshing between the braking gear portion 55B and the engaging gear 44 is released. The compression coil spring 58 is disposed in a compressed state between the ceiling plate 14A of the case 12 and the brake member 55. The brake member 55 is displaced to the braked position by the urging force of the compression coil spring 58.

The recording tape cartridge 10 is further provided with the clutch member 60, which is operated from the outside when a state of locking of the reel 11 by the brake member 55 is to be released. The clutch member 60 is pushed by the rotary shaft 100 when the driving gear 102 of the rotary shaft 100 of the drive device meshes with the reel gear 42, and displaces the brake member 55 upward, that is, toward the rotation-allowed position.

Specifically, the clutch member 60 is disposed between the floor portion 36 of the reel 11 and the brake member 55, and includes a clutch main body 62 that penetrates through the floor portion 36. Respective plural numbers of guide ribs 64 and stopper ribs 68 are provided extending to the radial direction outer side from the clutch main body 62. The guide ribs 64 are inserted into rotation restriction slots 66 that are formed in the clutch boss portion 52 of the reel 11, and perform a function of restricting relative rotation of the clutch member 60 with respect to the reel 11 and a function of guiding the clutch member 60 in the axial direction of the reel 11. The stopper ribs 68 abut against bottom faces of stopper slots 70 that are formed in the clutch boss portion 52, and perform a function of positioning the clutch member 60 in the axial direction with respect to the reel 11 (which includes a disengagement prevention function).

According to the above, as shown in FIG. 7, the brake member 55 is a structure of which the braking gear portion 55B is meshed with the reel gear 42 by the urging force of the compression coil spring 58 when the recording tape cartridge 10 is not in use, and rotation of the reel 11 relative to the case 12 is prevented. However, as shown in FIG. 8, when the reel gear 42 of the reel 11 is meshed with the driving gear 102 of the rotary shaft 100 of the drive device, the clutch member 60 that is pushed by the rotary shaft 100 displaces the brake member 55 to the rotation-allowed position, and rotation of the reel 11 relative to the case 12 is allowed.

—Detailed Structure of Reel—

As shown in FIG. 1, the reel 11 according to this exemplary embodiment is a two-piece structure, of a hub with lower flange member 72 attached thereto and an upper flange member 74. The hub with lower flange member 72 is integrally formed of the reel hub 32 and the lower flange 38. The upper flange member 74 is a flange member that serves as a principal portion of the upper flange 40. The reel hub 32 and lower flange 38 of the hub with lower flange member 72 are integrally formed by injection-molding of a glass fiber-reinforced resin (GFRP), which serves as a fiber-reinforced resin. This exemplary embodiment has a structure in which the reel plate 54 made of metal is fixed in the floor portion 36 by insert-molding.

Giving further description of the GFRP constituting the hub with lower flange member 72, this GFRP is a resin in which approximately 10% by weight of glass fibers serving as reinforcement fibers are mixed into a polycarbonate that serves as a thermoplastic resin. The GFRP has, for example, a bending elastic modulus of approximately 3400 MPa.

The upper flange member 74 is a structure in which an annular rib 76 protrudes from an inner edge portion of the upper flange 40 formed in an annular shape. The annular rib 76 fits into an inner periphery of the tube portion 34 of the reel hub 32. In a state in which the annular rib 76 is fitted into the upper side opening end of the tube portion 34 of the reel hub 32, a radial direction outer side region of the annular rib 76 (a region between the upper flange 40 and the annular rib 76) is fixed to an upper end face 34A of the tube portion 34 by ultrasonic welding or the like. Thus, the upper flange member 74 is structured.

The upper flange member 74 is constituted by a material with a higher bending elastic modulus than the material constituting the hub with lower flange member 72. Specifically, the upper flange member 74 is constituted by a GFRP with a content of 20-30% by weight of glass fibers in the same kind of polycarbonate as the polycarbonate constituting the hub with lower flange member 72. In this exemplary embodiment, the GFRP constituting the hub and upper flange member 74 has a bending elastic modulus of approximately 6600 MPa (if the glass fiber content is 30% by weight).

The reel 11 constituted by the materials described above is deformed relative to a state in which the magnetic tape T is not wound thereon by a winding pressure that is applied in the state in which the magnetic tape T is wound on. In a state after this deformation of the recording tape cartridge 10, a space (distance) D that is a magnitude(s) (a scalar quantity) of an edge clearance Ce that is a gap/gaps in the width direction of the magnetic tape T (the axial direction of the reel 11) between the lower flange 38 and/or the upper flange 40, and the magnetic tape T is prescribed. This is described more specifically below.

When the reel hub 32 provided with the tube portion 34, whose upper side is opened as described above, is deformed by the winding pressure of the tape, the magnetic tape T is wound round the tube portion 34 so as to be offset to one side, for example, toward the upper flange 40 as shown in FIG. 2. Hence, of spaces D of the edge clearance Ce, an outer periphery side space (distance) Do, which is the shortest distance between a lower end Tod of the outermost periphery portion of the magnetic tape T and the lower flange 38, in the state shown in FIG. 3 in which the magnetic tape T is completely wound on, is prescribed. In this exemplary embodiment, the distance Do specified as described above is given the following.

$0.18 \text{ mm} \leq Do \leq 0.46 \text{ mm}$

If the edge clearances Ce are formed at both hub axial direction sides, the above Do is the sum of the upper side Do and the lower side Do.

Note that taper shape of the upper and lower flanges is exaggerated in FIG. 2 and FIG. 3.

A width W of the magnetic tape T in the present exemplary embodiment is a nominal 12.65 mm. Therefore, in the state in which the magnetic tape T is completely wound on, a facing distance Dfo of the outermost periphery portion in the axial direction between the lower flange 38 and the upper flange 40, at a radial direction position corresponding (coinciding) with the outermost periphery position of the magnetic tape T, satisfies the following expression.

$12.83 \text{ mm} \leq Dfo \leq 13.11 \text{ mm}$

That is, the facing distance Dfo has a dimensional tolerance of 0.14 mm and the following expression applies.

$Dfo = 12.97 \text{ mm} \pm 0.14 \text{ mm}$

Meanwhile, in the state in which the magnetic tape T is completely wound on, a facing distance Dfi in the axial direction between the lower flange 38 and the upper flange 40 at a radial direction position corresponding (coinciding) with the innermost periphery position of the magnetic tape T (the outer periphery face of the tube portion 34), satisfies the following expression.

$12.65 \text{ mm} \leq Dfi \leq 12.77 \text{ mm}$

That is, the facing distance Dfi has a dimensional tolerance of 0.06 mm, and the following expression applies.

$Dfi = 12.71 \text{ mm} \pm 0.06 \text{ mm}$

The facing distances Dfi and Dfo mentioned above are described further. The facing distance Dfi at the innermost periphery portion is determined as follows in consideration of the width W of the magnetic tape T and a fabrication tolerance (surface runout) Ai (not shown in the drawings) of each of the lower flange 38 and the upper flange 40 at the innermost periphery portion.

$Dfi = W + |Ai| \times 2 + Ai \times 2$

In this exemplary embodiment, the facing distance Dfi is specified as described above given the following.

$Ai = \pm 0.03 \text{ mm}$

The facing spacing Dfo at the outermost periphery portion is determined in consideration of a manufacturing tolerance Ao of each of the lower flange 38 and the upper flange 40 at the outermost periphery portion, the fabrication tolerance Ai of each of the lower flange 38 and the upper flange 40 at the innermost periphery portion, and a minimum flange taper amount Dtmin that is needed (required for both the upper and lower flanges) in a case in which a tilt of the rotary shaft 100 of the drive device and suchlike are taken into account.

$Dfo = Dfi + |Ai| \times 2 + Dt\min \times 2 + |Ao| \times 2 + Ao \times 2$

In this exemplary embodiment, the facing distance Dfo is specified as described above given the following.

$Ao = \pm 0.07 \text{ mm}$ $Dt\min = 0.03 \text{ mm}$

The space D of the edge clearance Ce is expressed, with a difference between the facing distance Df between the upper and lower flanges 38 and 40 and the width W of the magnetic tape T, as follows.

$D = Df - W$ $Do = Dfo - W$

Thus, in the present exemplary embodiment, the space D of the edge clearance Ce between the upper and lower flanges 38 and 40 and the magnetic tape T is set to a minimum space that satisfies the requirements of fabrication (mass production) and the requirements of use (winding and unwinding of the tape). In particular, the minimum value of the space Do of the edge clearance Ce is specified as described above subject to the constraints of the requirements of fabrication (mass production) and the requirements of use.

Further description of (an example of) a practical method of measuring the facing distances Dfi and Dfo between the upper and lower flanges 38 and 40 is now given. Plural measurement points are specified along the circumferential direction for the respective innermost periphery portion and the outermost periphery portion, which points are at the radial direction positions at the facing spacings Dfi and Dfo in the upper and lower flanges 38 and 40. In this example, measurement points are specified at 12 locations at 30 degree intervals at each of the innermost periphery portion and the outermost periphery portion in each of the upper and lower flanges 38 and 40 (a total of 48 locations). The positions of the measurement points in the circumferential direction coincide between the lower flange 38 and the upper flange 40.

First, in the state in which the magnetic tape T is completely wound on, the axial direction positions of the measurement points at the lower face of the lower flange 38, which is the face at the opposite side thereof from the side at which the magnetic tape T is disposed, are measured with a three-dimensional measurement instrument or the like. On the basis of the measurement results, average heights $Hi_{38}$ and $Ho_{38}$ of the measurement points at the innermost periphery portion and the outermost periphery portion from a predetermined reference plane, which is a plane orthogonal to the axial direction, are calculated. Similarly, in the state in which the magnetic tape T is completely wound on, the axial direction positions of the measurement points at the upper face of the upper flange 40, which is the face at the opposite side thereof from the side at which the magnetic tape T is disposed, are measured with the three-dimensional measurement instrument or the like. On the basis of the measurement results, average heights $Hi_{40}$ and $Ho_{40}$ of the measurement points from the above mentioned reference plane at the innermost periphery portion and the outermost periphery portion are calculated.

Then, the magnetic tape T is unwound from the reel 11 and removed. In this state, axial direction positions of the measurement points are measured at both the upper and lower faces of the lower flange 38 with the three-dimensional measurement instrument or the like. On the basis of these measurement results, average thicknesses $ti_{38}$ and $to_{38}$ at the innermost periphery portion and outermost periphery portion of the lower flange 38 are calculated. Similarly, axial direction positions of the measurement points are measured at both the upper and lower faces of the upper flange 40 with the three-dimensional measurement instrument or the like. On the basis of these measurement results, average thicknesses $ti_{40}$ and $to_{40}$ at the innermost periphery portion and outermost periphery portion of the upper flange 40 are calculated.

On the basis of the above-mentioned average heights $Hi_{38}$ and $Hi_{40}$ and average thicknesses $ti_{38}$ and $ti_{40}$ at the innermost periphery portion, the facing distance Dfi in the state in which the magnetic tape T is completely wound on is calculated. Similarly on the basis of the average heights $Ho_{38}$ and $Ho_{40}$ and average thicknesses $to_{38}$ and $to_{40}$ at the outermost periphery portion, the facing distance Dfo in the state in which the magnetic tape T is completely wound on is calculated. The calculations are as follows.

$$Dfi = Hi_{40} - Hi_{38} - ti_{38} - ti_{40}$$

$$Dfo = Ho_{40} - Ho_{38} - to_{38} - to_{40}$$

The spaces D of the respective portions of the edge clearance Ce (which is to say, the maximum space Do at the outermost periphery portion) are not more than a width Wg of an edge guard band Tg that is provided at the width direction end portion of the magnetic tape T. Therefore, if the width Wg of the edge guard band Tg is 0.46 mm or more, the following expression applies.

$$0.18 \text{ mm} \leq Do \leq 0.46 \text{ mm}$$

If the width Wg of the edge guard band Tg is less than 0.46 mm, this width Wg is the maximum limit of the space Do of the edge clearance Ce at the outermost periphery portion. For example, if the width Wg is 0.45 mm, the following expression applies.

$$0.18 \text{ mm} \leq Do \leq 0.45 \text{ mm}$$

Figure 5:
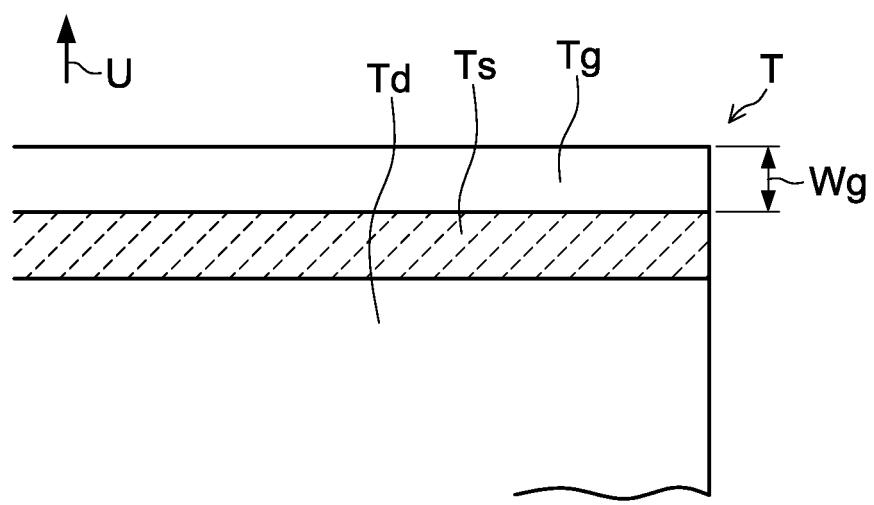
FIG. 5 is a side view in which a portion of a magnetic tape constituting the recording tape cartridge in accordance with the exemplary embodiment of the present invention is shown magnified.

Giving a further description of the edge guard band Tg, information is recorded at a data region Td of the magnetic tape T and, as shown in FIG. 5, a servo band Ts at which a servo signal is recorded is set adjacent to a width direction outer side of the data region Td. The edge guard band Tg is set adjacent to the width direction outer side of the servo band Ts. Although not shown in the drawings, the servo band Ts and the edge guard band Tg are set at both width direction sides of the magnetic tape T.

By specification of the above-described inner and outer facing distances Dfi and Dfo, the distance Df between the lower flange 38 and the upper flange 40 is given a taper shape that is wider at the outer periphery side than at the inner periphery side. In this exemplary embodiment, both an upper face 38U and a lower face 40L, which are the faces of the lower flange 38 and the upper flange 40 at the respective magnetic tape T sides thereof, are taper faces. In this exemplary embodiment, a center value of the facing distance Dfo is wider by 0.28 mm, that is, by 0.14 mm each above and below, than a center value of the facing distance Dfi. That is, the upper face 38U of the lower flange 38 and the lower face 40L of the upper flange 40 are taper faces with substantial symmetry between above and below.

Further, in the recording tape cartridge 10, the upper face 38U of the lower flange 38 and the lower face 40L of the upper flange 40 have taper shape such that a rate of widening (increasing) of the facing distance Df increases from the inner periphery side to the outer periphery side. Specifically, an amount of change dDf of the facing distance Df per unit amount of movement dr toward the radial direction outer side of the lower flange 38 and upper flange 40, which is a rate of widening (dDf/dr) of the facing distance Df, is larger at the outer periphery side than at the inner periphery side, such that the faces are convex surfaces that protrude toward the magnetic tape T are formed. In other words, the upper face 38U of the lower flange 38 and the lower face 40L of the upper flange 40 each protrude toward the magnetic tape T side relative to imaginary lines IL (i.e., relative to a taper shape with a constant rate of widening) that linearly join the inner and outer edges of each in a sectional view taken along the axial direction and the radial direction, as illustrated in FIG. 3.

Further description is given of (an example of) a practical method of measuring the rate of widening (dDf/dr) of the facing distance Df of the upper and lower flanges 38 and 40. At each of the upper face 38U of the lower flange 38 and the lower face 40L of the upper flange 40, rows of measurement points in which plural measurement points are arranged along the radial direction are specified. Circumferential direction positions of the rows of measurement points may be the same at the lower flange 38 and the upper flange 40 and may be different. The measurement points are arranged in the measurement point row at intervals of a predetermined distance dr (for example, 1 mm) from the innermost periphery portion to (a vicinity of) the outermost periphery portion. Axial direction positions of the measurement points are measured at each of the upper face 38U of the lower flange 38 and the lower face 40L of the upper flange 40. Differences between the axial direction positions of measurement points that are adjacent in the radial direction (which may be differences between heights of the adjacent measurement points from a predetermined reference plane that is a plane orthogonal to the axial direction) are divided by the predetermined distance dr, and the rate of widening of the facing distance Df (dDf/dr) is calculated for respective positions in the radial direction. The rate of widening (dDf/dr) of the facing distance Df may be measured at plural locations in the circumferential direction of the lower flange 38 and the upper flange 40. The practical measurements of the rate of widening (dDf/dr) of the facing distance Df described hereabove may be carried out with a three-dimensional measuring instrument or the like in a state in which the magnetic tape T has been unwound and removed from the reel 11.

A surface roughness of each of the upper face 38U of the lower flange 38 and the lower face 40L of the upper flange 40, evaluated as a center line average roughness Ra, is at least 0.5 µm and at most 2 µm (0.5 µm≤Ra≤2 µm). The lower flange 38 and the upper flange 40 that are constituted of GFRP as described above have surface roughnesses Ra of the upper face 38U and lower face 40L that satisfy the condition 0.5 µm≤Ra≤2 µm without a mechanical process or the like being applied after the injection molding.

Next, operation and effects of the present exemplary embodiment are described.

As shown in FIG. 7, when the recording tape cartridge 10 with the structure described above is not in use, the brake member 55 is disposed at the rotation-locking position by the urging force of the compression coil spring 58, and the braking gear portion 55B is meshed with the engaging gear 44. Therefore, rotation of the reel 11 relative to the case 12 is blocked. At this time, the reel gear 42 of the reel 11 is exposed through the gear aperture 20, and the clutch main body 62 of the clutch member 60 is inserted into the penetrating hole 50 and faces the gear aperture 20.

When the magnetic tape T is to be used, the recording tape cartridge 10 is loaded, in the direction of arrow A, into a bucket (not shown in the drawings) of a drive device. When the recording tape cartridge 10 is loaded to a predetermined depth in the bucket, the bucket descends, the rotary shaft 100 of the drive device relatively approaches (moves upward to) the gear aperture 20 of the case 12, and the rotary shaft 100 retains the reel 11. More specifically, the rotary shaft 100 attracts and retains the reel plate 54 with the magnet 104, without contact between the magnets, and the driving gear 102 is meshed with the reel gear 42.

In association with the meshing between the reel gear 42 and the driving gear 102, that is, with the relative movement of the driving gear 102 to approach the case 12 in the axial direction, an axial central portion of the rotary shaft 100 abuts against the clutch main body 62 of the clutch member 60 and pushes the clutch member 60 upward in opposition to the urging force of the compression coil spring 58. Consequently, the brake member 55 abutting against the clutch member 60 also moves upward, and the meshing between the braking gear portion 55B of the brake member 55 and the engaging gear 44 is released.

Thus, the brake member 55 reaches a relative rotation-allowed position with respect to the reel 11. When the rotary shaft 100 is moved further upward, the clutch member 60 and the brake member 55 are lifted upward together in the reel 11 in opposition to the urging force of the compression coil spring 58 (without the relative positions of the clutch member 60 and the brake member 55 changing). Thus, in the recording tape cartridge 10, the brake member 55 reaches an absolute rotation-allowed position (with respect to the case 12), and the lower flange 38 is separated from the annular rib 22. As described above and shown in FIG. 8, the reel 11 floats freely inside the case 12, and is rotatable in a state of not touching the inner faces of the case 12. Although not described in detail here, the recording tape cartridge 10 is positioned in horizontal directions and a vertical direction with respect to the drive device by the bucket by the recording tape cartridge 10 descending in the drive device.

Hence, drawing pins (not shown in the drawings) of the drawing portion of the drive device are engaged with the leader block 30, and the drawing portion disengages the leader block 30 from the case 12 and guides the leader block 30 to the take-up reel of the drive device. Then, the leader block 30 is fitted into the take-up reel and structures a portion of a winding surface onto which the magnetic tape T is to be wound. In this state, the leader block 30 turns integrally with the take-up reel, and the magnetic tape T is taken up onto a reel hub of the take-up reel while being drawn out from the case 12 through the opening 18.

At this time, the reel 11 of the recording tape cartridge 10 is turned synchronously with the take-up reel by rotary force of the rotary shaft 100 that is transmitted by the driving gear 102 meshed with the reel gear 42. Information is recorded onto the magnetic tape T and/or information recorded on the magnetic tape T is replayed by a recording/replay head that is disposed along a predetermined tape path in the drive device. During this, the brake member 55 that is not rotatable with respect to the case 12 is in sliding contact with the clutch member 60 that turns, together with the reel 11, relative to the case 12.

Hence, when the magnetic tape T has been wound back to the reel 11 and the leader block 30 retained in the vicinity of the opening 18 of the case 12, the bucket in which the recording tape cartridge 10 is loaded ascends. Correspondingly, the meshing between the reel gear 42 and the driving gear 102 is released, the abutting between the rotary shaft 100 and the clutch member 60 is released, and the clutch member 60 is moved downward together with the brake member 55 (maintaining the state of abutting against the brake member 55) by the urging force of the compression coil spring 58.

Accordingly, the stopper ribs 68 of the clutch member 60 abut against bottom faces of the stopper slots 70 and the braking gear portion 55B of the brake member 55 meshes with the engaging gear 44. That is, the brake member 55 returns to the rotation-locking position that blocks rotation of the reel 11 with respect to the case 12. In accordance with the operation in which the brake member 55 and the clutch member 60 are moved by the urging force of the compression coil spring 58, the reel 11 also moves downward, and returns to the initial state in which the lower flange 38 is abutted against the annular rib 22 and the reel gear 42 is exposed through the gear aperture 20. In this condition, the recording tape cartridge 10 is ejected from the bucket.

Now, at the reel 11 that is being driven to rotate by the driving gear 102 meshed with the reel gear 42 as described above, a portion of the torque is converted to a force in the axial direction (a thrust force) by the meshing faces 42E and 102E that are inclined with respect to the axial direction. That is, in the reel 11, the urging force of the compression coil spring 58 acts towards the rotary shaft 100 and the thrust force associated with the torque transmission acts in opposition to the urging force, so the reel rotates while fluctuating (vibrating) in the axial direction.

As a result, the magnetic tape T runs while fluctuating in the width direction. Of these fluctuations of the magnetic tape T, the head of the drive device tracks (corrects position for) fluctuations which are at a predetermined frequency or above on the basis of servo signals in the servo band Ts. In consequence, the fluctuations have no influence on recording and replaying of information. However, of the fluctuations of the magnetic tape T in the width direction, components that cannot be tracked are treated as position error signals (PES), and it is desirable for the position error signals (amplitudes of fluctuations (vibrations) that the head cannot follow) to be small. Conventionally, it has been considered that PES becomes deterioration by contact between the flanges and the magnetic tape T, so dealing with PES by widening the space D of the edge clearance Ce.

However, the present inventors have attained new knowledge that the smaller an edge clearance, the more position error signals (PES) are suppressed. This point is described with reference to FIG. 6, which illustrates position error signal (PES) measurement results. FIG. 6 shows results in which position error signals are measured using two kinds of test reel, TR1 and TR2, which are not included in the present invention. The horizontal axis shows the distance between a pair of upper and lower flanges (the distance in a state in which a magnetic tape T is not wound thereon), and the vertical axis shows measured values of position error signals (PES).

Test reel TR1, in the state in which the magnetic tape T is not wound on, gives the following results.

$Dfi=12.985$ mm,$Dfo=13.318$ mm

Test reel TR2, in the state in which the magnetic tape T is not wound on, gives the following results.

$Dfi=12.783$ mm,$Dfo=13.081$ mm

The opposing faces of the upper and lower flanges of the test reels TR1 and TR2 form taper shapes with the facing distances therebetween having constant rates of widening. Except for the dimensions and shapes of the upper and lower flanges described above, the test reels TR1 and TR2 have structures the same as the reel 11.

Accordingly, FIG. 6 shows measured values of position error signals (PES) of test reel TR2 for facing distances Df between the upper and lower flanges in the range from 12.783 to 13.081 mm, and shows measured values of position error signals (PES) of test reel TR1 for facing distances Df between the upper and lower flanges in the range from 12.985 to 13.138 mm. More specifically, the position error signals (PES) are shown for when a part of the magnetic tape T that has been wound in a region with the corresponding facing distance Df is passing a PES measurement sensor (in the vicinity of a head).

From FIG. 6, it can be seen that the position error signals (PES) of test reel TR2, in which the facing distances Df between the upper and lower flanges are relatively small, are kept smaller than the position error signals (PES) of test reel TR1. With both the test reels TR1 and TR2, it can be seen that the position error signals (PES) are suppressed more at the inner periphery side at which the facing distances Df between the upper and lower flanges are relatively small than at the outer periphery side. The finding described above is not disclosed anywhere in JP-A Nos. 11-306714, 2005-302256 and 2009-211743 or Japanese Patent No. 4,679,733. Giving a further description of Japanese Patent No. 4,679,733, in the structure thereof, position error signals (PES) are reduced by a distance between collar portions of reel being prescribed and a running magnetic tape being reliably aligned with flanges of a guide roller at a drive side. In contrast, according to the knowledge attained by the present inventors, regardless of whether there are flanges at a guide roller at a drive device or such flanges are absent, the position error signals (PES) are kept smaller where the facing distance Df is relatively smaller, as shown in FIG. 6. This has been experimentally verified.

In the recording tape cartridge 10, as described above, the spaces D of the edge clearance Ce are set to values that are (close to) minimums required for fabrication and for use. Therefore, in the recording tape cartridge 10, position error signals (PES) that arise with running of the magnetic tape T (rotation of the reel 11) are kept small.

In addition, in the recording tape cartridge 10, the upper face 38U of the lower flange 38 and the lower face 40L of the upper flange 40 have taper shape in which the rate of widening of the facing distance Df increases from the inner periphery side to the outer periphery side, and the upper face 38U and lower face 40L protrude toward the magnetic tape T side relative to the imaginary lines IL. Due to this characteristic structure, the facing distances D of the edge clearances Ce between the upper face 38U of the lower flange 38 and the lower face 40L of the upper flange 40, and the magnetic tape T can be made smaller than in a comparative example provided with a pair of flanges with taper shapes along the imaginary lines IL, that have a constant rate of widening. That is, even in a structure in which the lower limit of the space Do at the outermost periphery portion is constrained or restricted by the requirements of fabrication (mass production) and the requirements of use (winding and unwinding of the tape), a portion in which the spaces D of the edge clearance Ce are small is expanded at the outer periphery side region.

Thus, in the recording tape cartridge 10, the spaces D of the edge clearance Ce are small and the position error signals (PES) are kept small through a wide range in the radial direction. In addition, average values of the position error signals (PES) over the whole length of the magnetic tape T are kept small, which contributes to an improvement in reliability of the recording tape cartridge 10.

In particular, at a portion of the magnetic tape T that is wound relatively to the inner periphery side, the facing distance Df between the upper and lower flanges is wider than in the state in which the magnetic tape T is completely wound on, due to a reduction in winding pressure associated with the magnetic tape T unwinding from the reel 11, therefore, the spaces D of the edge clearance Ce increase during actual running. At this time, because the upper face 38U of the lower flange 38 and the lower face 40L of the upper flange 40 have the shapes described above, the spaces D of the image clearance Ce are small even after the facing distances Df between the upper and lower flanges have widened, and position error signals (PES) are kept small.

Thus, with the recording tape cartridge 10 according to the present exemplary embodiment, position error signals (PES) can be kept small during actual running of the magnetic tape T.

In the recording tape cartridge 10, the surface roughnesses of the upper face 38U of the lower flange 38 and the lower face 40L of the upper flange 40 are set to 0.5 µm≤Ra≤2 µm.

Consequently, position error signals (PES) during running of the magnetic tape T can be kept even smaller. That is, in the structure in which the spaces D of the edge clearance Ce are small, the magnetic tape T runs while touching (sliding) against the upper face 38U of the lower flange 38 and/or the lower face 40L of the upper flange 40. Due to that the surface roughness described above is set to be more than or equal to 0.5 µm, friction between the magnetic tape T and the upper and lower flanges 38 and 40 can be reduced, and position error signals (PES) of the magnetic tape T can be reduced. Meanwhile, due to that the surface roughness is set to be less than or equal to 2.0 µm, a deterioration in position error signals (PES) due to surface roughness (protrusions and indentations) of the upper face 38U and lower face 40L can be suppressed.

Because the hub with lower flange member 72 and the upper flange member 74 of the reel 11 are constituted of GFRP, which is a high-elasticity material, deformations of the reel hub 32, the lower flange 38 and the upper flange 40 themselves due to winding pressure of the magnetic tape T are suppressed. Therefore, the outer periphery side space Do, and Dfo and Dfi can be accurately obtained in the state in which the magnetic tape T is completely wound on, which contributes to keeping position error signals (PES) small as described above.

In particular, with the reel hub 32 in which the floor portion 36 is provided at one end of the tube portion 34 and the other end of the tube portion 34 is an opening end, stiffness at the opening end side tends to be insufficient relative to the stiffness at the floor portion 36 side. However, the upper flange 40 that is constituted of a material with a higher elasticity than the material constituting the reel hub 32 is fixed to the opening end of the tube portion 34. Therefore, the opening end side of the tube portion 34 is reinforced by the upper flange 40, and deformations of the reel hub 32, the lower flange 38 and the upper flange 40 themselves are even more effectively suppressed. Moreover, differences in degrees of deformation between the two axial direction sides are small. Therefore, a shape in which the magnetic tape T is wound on the tube portion 34 is stable, which contributes to position error signals (PES) being kept even smaller.

In the recording tape cartridge 10 described above, the spaces D of the edge clearance Ce are not more than the width Wg of the edge guard band Tg of the magnetic tape T. Therefore, if there is a single protruding wind Tz of the magnetic tape T as illustrated in FIG. 2, due to irregular winding of the magnetic tape T or the like, folding of the servo band Ts of the magnetic tape T is prevented or effectively suppressed. That is, if a circumferential portion of the protruding wind Tz makes contact with the lower flange 38 due to transportation of the recording tape cartridge 10 or a fall or the like, folding occurs at the protruding wind Tz. However, because the spaces D of the edge clearance Ce are not more than the width Wg of the edge guard band Tg of the magnetic tape T, the protruding wind Tz is kept within the range of the edge guard band Tg, and a portion at which folding occurs is within the range of the edge guard band Tg. Therefore, occurrences of servo errors, which are failures in reading of the servo signal by the head of a drive device, are suppressed.

In particular, in the recording tape cartridge 10, the upper face 38U of the lower flange 38 and the lower face 40L of the upper flange 40 have the taper shape with the faces protruding toward the magnetic tape T side relative to the imaginary lines IL as described above. Thus, a range in which the spaces D of the edge clearance Ce are sufficiently smaller than the width Wg of the edge guard band Tg is set to be wide in the radial direction of the reel 11. Therefore, even if folding occurs at the edge guard band Tg, the folding occurs at a region that is separated in the width direction of the magnetic tape T from the servo band Ts. Therefore, folding of the edge guard band Tg is less likely to affect states of contact of the servo band Ts with the head, and occurrences of servo errors are even more effectively suppressed.

Herein, in the exemplary embodiment described above, an example is presented in which the upper flange member 74 is joined to the hub with lower flange member 72 in which the lower flange 38 is formed integrally with the reel hub 32 (which is referred to as a two-piece structure). However, the present invention is not limited thus. For example, a structure is possible in which the upper flange 40 is formed integrally at the opening end side of the reel hub 32 and the lower flange 38 is a separate member that is joined to the other end side of the reel hub 32. As a further example, a structure is possible in which (a member including) the upper flange member 74 and (a member including) the lower flange 38 are joined to the reel hub 32 having shape of a tube with a bottom (which is referred to as a three-piece structure).

In the exemplary embodiment described above, an example is presented in which a polycarbonate containing glass fibers is used as the material constituting the reel hub 32, the lower flange 38 and the upper flange 40, but the present invention is not limited thus. It will be clear that various materials may be used, such as, for example, carbon-fiber reinforced resins (CFRP) and the like.

In the exemplary embodiment described above, an example is illustrated in which the upper flange member 74 is constituted of a material with a higher elasticity than the hub with lower flange member 72, but the present invention is not limited thus. For example, the upper flange member 74 may be constituted of a material with the same elastic modulus as the hub with lower flange member 72. As a further example, the upper flange member 74 may be constituted of a material with a lower elasticity than the hub with lower flange member 72. In such a case, a structure in which, for example, the opening end side of the tube portion 34 is reinforced with a reinforcing member such as a metal ring or the like is preferable.

In the exemplary embodiment described above, an example is presented in which the reel gear 42 includes the meshing faces 42E that are inclined with respect to the axial direction, and the axial direction position of the reel 11 with respect to the drive device is set by the meshing between the reel gear 42 and the driving gear 102. However, the present invention is not limited thus. For example, a structure is possible in which the reel 11 includes a reference portion, at a region other than the reel gear 42, that makes contact with a positioning portion of the rotary shaft 100 and serves as an axial direction position reference with respect to the drive device.

In the exemplary embodiment described above, an example is presented in which the space D of the edge clearance Ce is not more than the width Wg of the edge guard band Tg, but the present invention is not limited thus. For example, a structure is possible in which the space D of the edge clearance Ce exceeds the width Wg of the edge guard band Tg. Furthermore, the present invention is not limited to structures in which the edge guard band Tg is set at both width direction sides of the magnetic tape T. For example, a structure is possible in which the edge guard band Tg is not set at a side to which the magnetic tape T tends to be offset in the wound state.

In the exemplary embodiment described above, an example is presented in which the upper face 38U of the lower flange 38 and the lower face 40L of the upper flange 40 are formed with symmetry between above and below, but the present invention is not limited thus. For example, a structure is possible in which the upper face 38U of the lower flange 38 and the lower face 40L of the upper flange 40 have non-symmetrical shapes. In such a case, one of the upper face 38U of the lower flange 38 or the lower face 40L of the upper flange 40 may be shaped along a plane that is orthogonal with respect to the axial direction (a shape without a taper). Alternatively, one of the upper face 38U of the lower flange 38 and the lower face 40L of the upper flange 40 may have a taper shape that linearly joins the inner and outer edges in a sectional view taken along the radial direction and the axial direction (a taper shape with a constant taper rate).

The upper and lower flanges of the present invention are not limited to structures in which the rate of widening of the facing distance Df therebetween increases continuously from the innermost periphery side to the outermost periphery side. For example, one or both of the upper face 38U of the lower flange 38 and the lower face 40L of the upper flange 40 may have a structure (a composite of two conical surfaces) in which a portion formed as a conical surface at which a rate of widening B of the facing distance Df is constant is disposed at the radial direction outer side of a portion formed as a conical surface at which a rate of widening A of the facing distance Df is constant, and B>A. Further, one or both of the upper face 38U of the lower flange 38 and the lower face 40L of the upper flange 40 may have a structure that is a composite conical surface formed of three or more conical surfaces.

It will be clear that the present invention may be embodied with numerous other modifications within a technical scope not departing from the spirit of the invention.

What is claimed is:

1. A recording tape cartridge comprising:
    a hub;
    a recording tape that is wound around the hub; and
    a pair of flanges, the respective flanges being provided to face one another at either end in an axial direction of the hub, a clearance in the axial direction between an outermost peripheral portion of the recording tape and one of the flanges in a state in which the recording tape is completely wound around the hub being from 0.18 mm to 0.46 mm, a facing distance between the flanges being wider at an outer peripheral side of the flanges than at an inner peripheral side of the flanges, and a rate of widening of the facing distance between the flanges continuously increasing toward the outer peripheral side of the flanges from an outer periphery face of the hub to a position near the outer peripheral side of the flanges in a radial direction of the flanges,
    wherein the rate of widening of the facing distance between the flanges is an amount of change of the facing distance between the flanges per unit amount of a distance from the inner peripheral side of the flanges in the radial direction to the outer peripheral side of the flanges in the radial direction.

2. The recording tape cartridge of claim 1, further comprising a driven gear that is configured at the hub or at one of the pair of flanges such that a position of the hub in the axial direction with respect to a drive device is set, at mesh-faces that are inclined with respect to the axial direction, by the driven gear being meshed with a driving gear at the drive device so as to be capable of transmitting rotation.

3. The recording tape cartridge of claim 1, wherein a surface roughness of a face at a recording tape side of at least one of the pair of flanges is from 0.5 μm to 2 μm as a center line average roughness.

4. The recording tape cartridge of claim 2, wherein a surface roughness of a face at a recording tape side of at least one of the pair of flanges is from 0.5 μm to 2 μm as a center line average roughness.

5. The recording tape cartridge of claim 1, wherein the hub and the flanges comprise fiber-reinforced resin.

6. The recording tape cartridge of claim 2, wherein the hub and the flanges comprise fiber-reinforced resin.

7. The recording tape cartridge of claim 1, wherein:
    the hub is formed in the shape of a circular tube with a bottom, of which one end side in the axial direction is opened and the other end side is closed; and
    of the pair of flanges, a flange that is disposed at the one end side of the hub comprises a material with an elastic modulus equal to or greater than an elastic modulus of a material forming the hub, and a flange that is disposed at the other end side of the hub is integrated with another end portion of the hub.

8. The recording tape cartridge of claim 2, wherein:
    the hub is formed in the shape of a circular tube with a bottom, of which one end side in the axial direction is opened and the other end side is closed; and
    of the pair of flanges, a flange that is disposed at the one end side of the hub comprises a material with an elastic modulus equal to or greater than an elastic modulus of a material forming the hub, and a flange that is disposed at the other end side of the hub is integrated with another end portion of the hub.

9. The recording tape cartridge of claim 3, wherein:
    the hub is formed in the shape of a circular tube with a bottom, of which one end side in the axial direction is opened and the other end side is closed; and
    of the pair of flanges, a flange that is disposed at the one end side of the hub comprises a material with an elastic modulus equal to or greater than an elastic modulus of a material forming the hub, and a flange that is disposed at the other end side of the hub is integrated with another end portion of the hub.

10. The recording tape cartridge of claim 5, wherein:
    the hub is formed in the shape of a circular tube with a bottom, of which one end side in the axial direction is opened and the other end side is closed; and
    of the pair of flanges, a flange that is disposed at the one end side of the hub comprises a material with an elastic modulus equal to or greater than an elastic modulus of a material forming the hub, and a flange that is disposed at the other end side of the hub is integrated with another end portion of the hub.

11. The recording tape cartridge of claim 1, wherein the rate of widening of the facing distance between the flanges increases toward the outer peripheral side such that the rate of widening of the facing distance between the flanges is larger at the outer periphery side than at the inner periphery side.

12. A recording tape cartridge comprising:
    a hub;
    a recording tape that is wound around the hub; and
    a pair of flanges, the respective flanges being provided to face one another at either end in an axial direction of the hub, sum of a clearance in the axial direction between a lower end of an outermost peripheral portion of the recording tape and a lower flange of the flanges in a state in which the recording tape is completely wound around the hub and a clearance in the axial direction between an upper end of the outermost peripheral portion of the recording tape and an upper flange of the flanges in the state in which the recording tape is completely wound around the hub being from 0.18 mm to 0.46 mm, a facing distance between the flanges being wider at an outer peripheral side of the flanges than at an inner peripheral side of the flanges, and a rate of widening of the facing distance between the flanges continuously increasing toward the outer peripheral side of the flanges from an outer periphery face of the hub to a position near the outer peripheral side of the flanges in a radial direction of the flanges, wherein the rate of widening of the facing distance between the flanges is an amount of change of the facing distance between the flanges per unit amount of a distance from the inner peripheral side of the flanges in the radial direction to the outer peripheral side of the flanges in the radial direction.

13. The recording tape cartridge of claim 12, wherein the rate of widening of the facing distance between the flanges increases toward the outer peripheral side such that the rate of widening of the facing distance between the flanges is larger at the outer periphery side than at the inner periphery side.

14. The recording tape cartridge of claim 1, wherein between an innermost periphery position of the flanges in the radial direction of the flanges and a vicinity of an outermost periphery position of the flanges in the radial direction of the flanges, the completely wound recording tape being located between the innermost periphery position and the vicinity of the outermost periphery position, the rate of widening of the facing distance between the flanges increases toward the outer peripheral side of the flanges.

15. The recording tape cartridge of claim 12, wherein between an innermost periphery position of the flanges in the radial direction of the flanges and a vicinity of an outermost periphery position of the flanges in the radial direction of the flanges, the completely wound recording tape being located between the innermost periphery position and the vicinity of the outermost periphery position, the rate of widening of the facing distance between the flanges increases toward the outer peripheral side of the flanges.

* * * * *